July 8, 1952   E. L. SHEEHAN   2,602,556
PIE-MAKING MACHINE

Filed March 29, 1950   3 Sheets-Sheet 1

Inventor
Elmer L. Sheehan

July 8, 1952  E. L. SHEEHAN  2,602,556
PIE-MAKING MACHINE

Filed March 29, 1950  3 Sheets-Sheet 2

Inventor
Elmer L. Sheehan

July 8, 1952  E. L. SHEEHAN  2,602,556
PIE-MAKING MACHINE
Filed March 29, 1950  3 Sheets-Sheet 3

Inventor
Elmer L. Sheehan

Patented July 8, 1952

2,602,556

UNITED STATES PATENT OFFICE 2,602,556

PIE-MAKING MACHINE

Elmer L. Sheehan, Chicago, Ill.

Application March 29, 1950, Serial No. 152,570

2 Claims. (Cl. 214—8.5)

This invention relates to pie making machines for carrying pie plates past successive stations at which dough is placed in them, trimmed and filled, and the pie is completely made, except for baking.

The making of pies in large quantities has been largely mechanized through the provision of machines incorporating a movable conveyor on which pie plates are carried singly or in clusters past a number of stations at which the pie making operations take place. At these stations, there are located such mechanisms as automatic dough rollers, crust trimmers, moisteners, and the like.

The large numbers of pie plates required for making pies in mass production quantities are of course most conveniently handled in nested stacks, and pie plates are therefore transported to the pie making machine in such stacks; but once arrived there and piled adjacent to the conveyor it became necessary to manually remove individual plates from the stack and to place them in holders on the conveyor at equi-spaced intervals so that they would be in position for filling. Heretofore one operator has had to devote his entire attention exclusively to this task, with the result that a disproportionately high labor cost has attended this relatively simple operation, especially in view of the fact that only two or three additional employees were required to perform all of the other necessary steps connected with the making of pies on a machine of the type under consideration.

It is therefore the main object of this invention to provide a pie making machine in which pie plates are automatically fed from a nested stack at a fixed loading station into the holders on the conveyor of the machine as the holders are successively brought to said loading station.

Another object of this invention resides in the provision of a pie making machine of the character described wherein the automatic loading or feeding mechanism for the pie plates is controlled by means so located on the conveyor of the machine as to effect actuation of the feed mechanism concommitantly with arrival of the pie plate holders at the loading station.

Another object of this invention resides in the provision of means for readily removably mounting the feed mechanism of this invention on a pie making machine so that the feed mechanism can be quickly and conviently replaced with another adapted to accommodate pie plates of a different size.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which.

Figure 1:
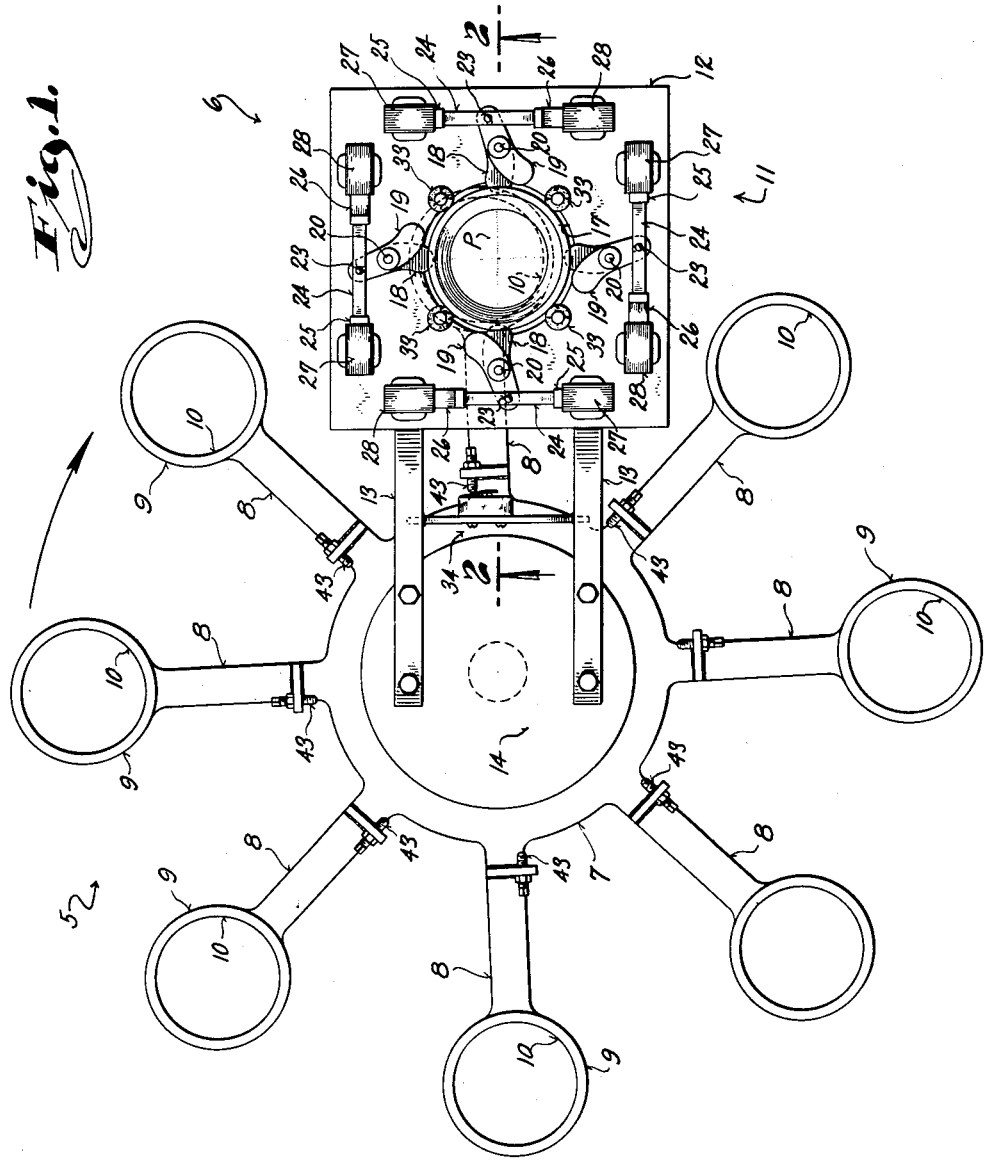
Figure 1 is a plan view more or less diagrammatically illustrating the application of the loading mechanism of this invention to a pie making machine of the rotary type.

Referring now more particularly to the accompanying drawings, in which like numerals designate like parts throughout the several views, the numeral 5 designates generally a conventional rotary type pie making machine having an endless conveyor adapted to carry pie plates from a loading station 6 past a number of other stations (not shown) at which crusts are rolled and placed in the pie plates, the crusts are trimmed, filled and covered, and the pies are otherwise prepared for baking. While the drawings show a rotary type of machine, it is to be understood that this is merely illustrative and that the loading mechanism of this invention is equally adaptable for use with other well known types of pie making machines having a straight line conveyor of the belt or chain type.

In the machine illustrated, the conveyor is in the form of a spider comprising an annular hub 7 constrained to rotate about a vertical axis, and from which extend a plurality of radial arms 8 having ring-like receptacles or holders 9 fixed to their outer ends. In the present case, each arm is shown provided with one such holder, but it will be readily understood that the holders may be arranged in clusters of two or more on each arm.

Figure 2:
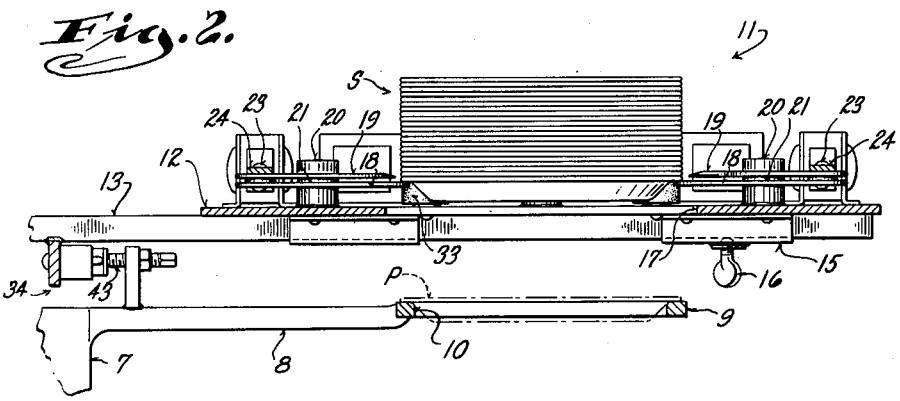
Figure 2 is a sectional view taken substantially on the plane of the line 2—2 in Figure 1.
Figure 3:
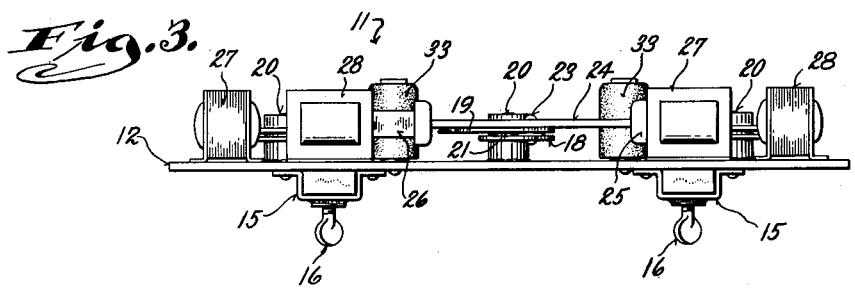
Figure 3 is a front elevational view of the loading mechanism per se.

Each holder 9 is adapted to carry a pie plate P by its rim, with the tapering sides and bottom portion of the plate received in the aperture 10 in the holder, as indicated in broken lines in Figure 2. The arms and their holders are angularly equispaced from one another while the holders are arranged along a circle concentric to the axis of the conveyor. Hence, it will be seen that rotation of the conveyor in one direction about its axis will carry the holders, one after the other, around a relatively large orbit to the loading station 6 and thereafter to the customary pie making stations (not shown) grouped about the machine.

Mounted on the pie making machine at the loading station 6 and directly over the orbit in which the holders travel is the pie plate feeding mechanism 11 of this invention. This mechanism comprises a flat, square platform 12 supported in a horizontal position on the machine by a pair of rails or arms 13. These rails have their inner ends fixed to a stationary "table" portion 14 of the machine overlying the conveyor spider, and extend outwardly in parallel relationship slightly beyond the orbit in which the holders travel. The platform 12 rests upon the outer ends of the rails 13 and is detachably secured thereto by means of a pair of straps 15 on the underside of the platform and wing bolts 16 threading upwardly through tapped holes in the straps and engaging the undersides of the rails to hold the platform stationary. This connection, of course, also provides for a degree of radial adjusting motion of the platform along the rails.

The platform is so disposed with respect to the conveyor that a central aperture 17 in the platform will align vertically with the centers of the receptacles or holders 9 as the latter pass under the platform to the loading station, to enable pie plates dropped flatwise through the aperture to fall directly into the receptacles therebeneath. The aperture 17, of course, is slightly larger in diameter than the pie plates to be fed onto the machine.

Grouped about the edge of the aperture 17 at the top side of the plate 12 are four equispaced pairs of supporting blades, each pair comprising a lower blade 18 and an upper blade 19. The supporting blades are flat and lever-like, and each pair of blades is medially pivotally mounted on a post 20 fixed to the plate 12 and projecting vertically from the topside thereof, the blades being disposed with their flat sides normal to the post.

Each upper support blade is spaced above its associated lower blade by means of a washer 21 on the post 20, the thickness of the washer being substantially equal to that of the rim of a pie plate so that the vertical spacing between the upper and lower blades is approximately equal to the thickness of a pie plate rim.

The inner ends of the blades of each pair project toward the central aperture 17 in the plate 12, and are curved (in outline) in opposite directions so as to have their inner extremities laterally offset or in divergent relationship. The outer ends of the blades of each pair thereof are exactly superimposed. Hence, when the blades are in their positions seen in Figure 1, with the inner extremity of each lower blade partially overlying the aperture 17, a stack S of pie plates can be supported on the lower blades, as seen in Figure 2.

All of the lower support blades are constrained to swing in a common horizontal plane and in their normal supporting position project under the rim of the lowermost pie plate of the stack at circumferentially spaced intervals around its periphery. From these positions, the lower blades are adapted to be swung to a retracted or releasing position, out of engagement with the rim of the lowermost pie plate, in which the lowermost plate is free to drop through the aperture 17 onto the conveyor.

As viewed from above, the inner extremities of the upper blades are normally in a retracted position, out of engagement with the pie plates in the stack, when the lower blades are in their normal extended supporting positions.

The two blades of each pair are adapted to be swung simultaneously to carry the lower blades to their retracted position, and such motion of the blades is attended by concurrent inward, extending, movement of the upper blades, which flatwise wedge themselves between the rims of the two lowermost pie plates of the stack and thus support the second lowest plate (and, of course, the rest of the stack) during release of the lowermost plate. For this purpose, the outer ends of the blades of each pair thereof have a common pivoted connection 23 with the medial portion of a link 24, the opposite ends of which links are connected to the plungers 25 and 26 of a pair of solenoids 27 and 28, respectively, so that the link rods are reciprocable endwise in consequence to alternate energization of their associated solenoids.

It will be noted that the inner curved ends of the upper support blades are so related to the lower blades as to engage the second lowest pie plate slightly before the lower blades retract completely, to preclude the possibility of the entire stack being dropped when the lower blades retract, and for this reason the leading edges of the upper blades are knife edged to facilitate their wedging themselves between the rims of the two lowest plates.

To effect release of the lowermost plate, all four of the solenoids 28 are energized simultaneously to impart clockwise swinging motion to the blades. This causes the lower blades to be retracted and the upper blades to be extended to support the stack of plates while the lowermost plate of the stack drops downwardly through the aperture 17 onto the conveyor. When the lowermost plate has been fed in this manner, the solenoids 27 are energized to effect counterclockwise swinging of the blades and return thereof to their normal positions seen in Figure 1. The lower supporting blades then attain a supporting position beneath the now-lowermost plate before the latter is entirely released by retraction of the upper blades; and, of course, retraction of the upper blades permits said plate (and thus, the entire stack) to drop down onto the lower supporting blades through a distance equal to the thickness of one pie plate rim.

To guide the pie plates in their flatwise downward movement, a number of rollers or guide posts 33 (four, in this instance) are mounted on the top of the platform for free rotation about vertical axes and are disposed at intervals around the aperture 17 in positions to engage the peripheries of the stacked pie plates. The guide posts are preferably freely rotatable because each actuation of the support arms tends to rotate the stack of pie plates slightly, in consequence to the swinging movement of the arms; and the guides are preferably provided with a surface of rubber or other resilient material.

Figure 4:
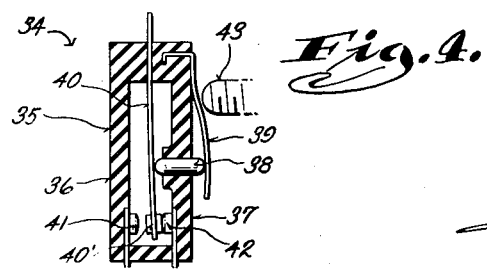
Figure 4 is a diagrammatic sectional view of a switch for controlling actuation of the loading mechanism.

A single-pole double-throw switch 34, secured to a fixed portion of the machine, as for example the mounting rails 13, controls energization of the solenoids 27 and 28 at the proper times to effect release of individual pie plates in relation to movement of the conveyor to predetermined positions. This switch is preferably of a simple type such as diagrammatically illustrated in Figure 4, comprising a hollow insulative housing 35 having a pair of opposite parallel side walls 36 and 37, one of which has a bore in which a capsule shaped push button 38 is axially slidable.

Figure 6:
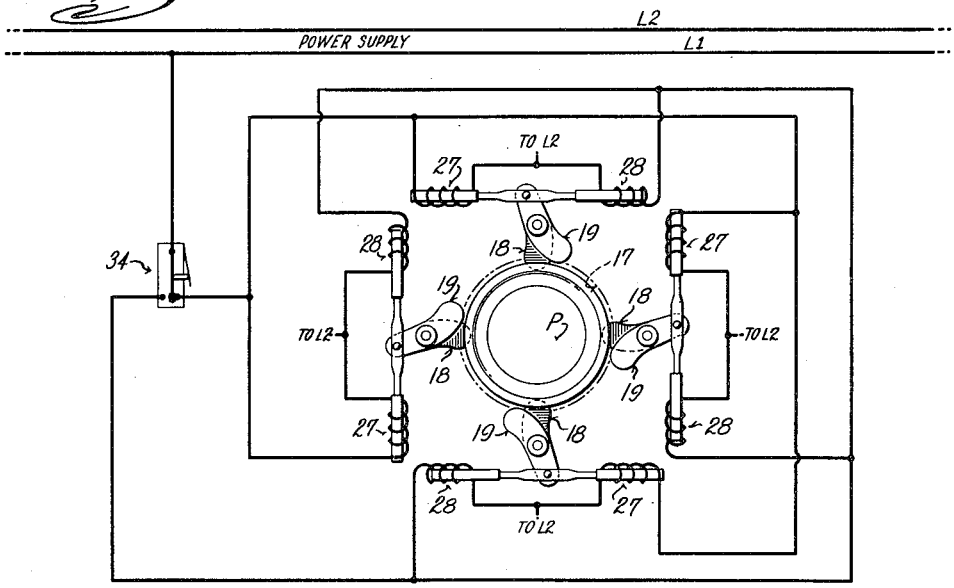
Figure 6 is a similar diagram showing the normal position of the mechanism.

The push button is confined between a leaf spring cam follower 39, secured to the housing at one end thereof and extending along the bored wall at the exterior thereof, and a contactor arm 40, which comprises another leaf spring secured at one of its ends at the same end of the housing and extending substantially parallel to the cam follower but at the interior of the housing. The contactor arm is adapted to be connected with one line $L_1$ of a power supply circuit, and its lower end is free to be swung back and forth toward the opposite side walls 36 and 37 to alternately carry a contact point 40' mounted thereon into circuit making engagement with fixed contact points 41 and 42 on said side walls which are connected, respectively, with one end of each of the solenoids 28 and 27. The contactor arm is normally biased toward the push button and thus into circuit making engagement with the fixed contact 42 to complete circuits through the four solenoids 27, see Figure 6, whereby the support blades are retained in their normal positions, with the lower support arm extended and the upper blades retracted.

Figure 5:
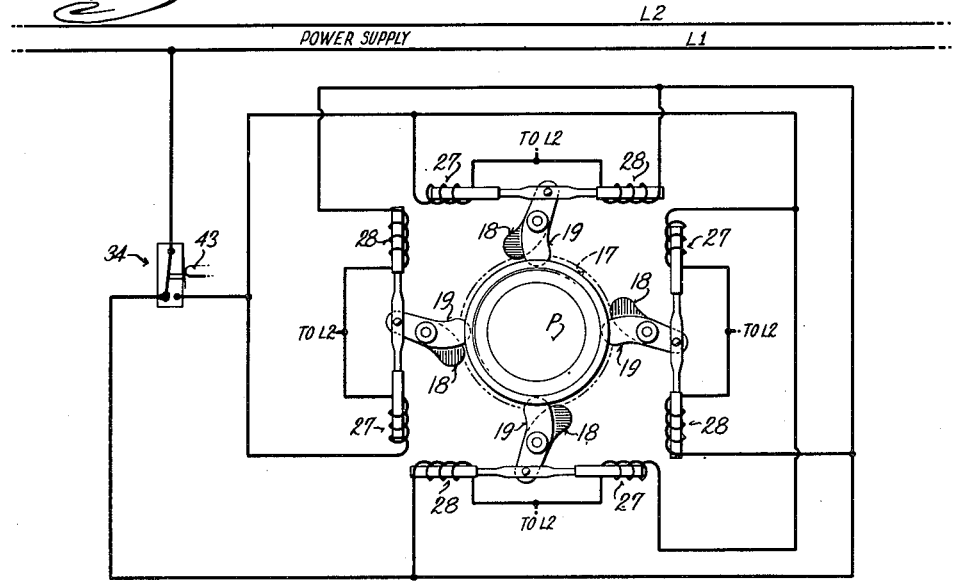
Figure 5 is a combined mechanical and electrical diagram showing the mechanism actuated to a position releasing the bottom plate of the stack.

A finger-like cam 43 is rigidly secured on each of the radial arms of the conveyor in a position in which it will depress the cam follower on the switch just as the plate holder on the arm comes to the feed station and consequently into alignment with the aperture 17 in the platform. The cam 43 thus actuates the contactor arm to swing out of circuit making engagement with the fixed contact 42 and into engagement with the contact 41, as seen in Figure 5, to thereby de-energize solenoids 27 and effect energization of the other four solenoids 28, whereby the support blades are swung clockwise to their releasing position to drop the lowermost pie plate of the stack at the loading station into the plate holder of the conveyor. As the conveyor moves on, the cam rides off of the cam follower and the contactor arm returns to its normal position in response to its bias, thus restoring the supporting blades to their normal positions with respect to the stack of pie plates, ready for a repetition of the releasing cycle with movement of the next succeeding conveyor arm to its receiving position at the loading station.

As will be obvious, the four solenoids 27 are all connected in parallel, as are the solenoids 28.

Figure 7:
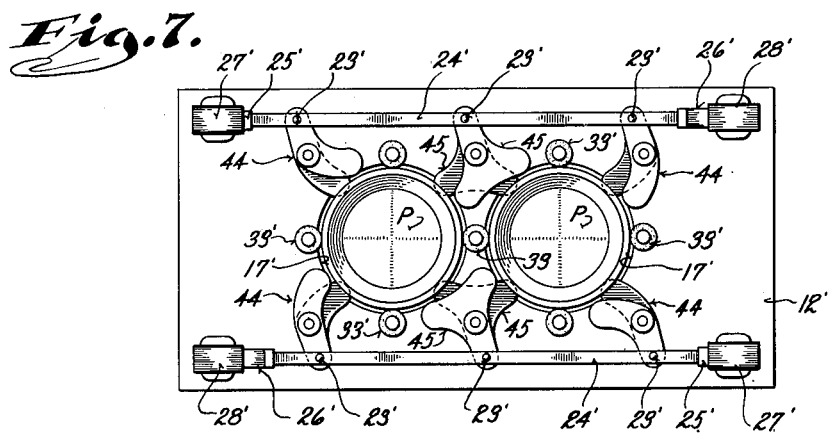
Figure 7 is a plan view of a modified embodiment of the loading mechanism of this invention.

The embodiment of the loading or feeding mechanism of this invention shown in Figure 7 is intended for use with a pie making machine having its plate holders arranged in pairs on the conveyor of the machine; and for this reason is adapted to dispense individual pie plates simultaneously from two separate but adjacent stacks. The Figure 7 loading mechanism is particularly adapted for use with machines for making relatively small pies and having pairs of small holders which are carried past the several pie making stations. The platform 12' in this embodiment is similar to that of the Figure 1 embodiment, but is rectangular rather than square in outline and is provided with two apertures 17' slightly larger in size than the smaller pie plates to be handled. Only two link rods 24' are required in this instance, one at each side of and parallel to a line joining the axes of the apertures 17'. Each rod is pivotally connected as at 23' with three pairs of supporting blades and is actuated by the plungers 25' and 26' of a pair of solenoids 27' and 28', respectively, as in the previously described embodiment. The supporting blades 44 of the two outer pairs are similar in shape to those of the Figure 1 embodiment, differing somewhat in curvature to accommodate their connections with the link rods at different angles. The support arms 45 of the central pairs, however, are substantially Y-shaped, so as to be able to operate simultaneously on both stacks of pie plates. Each stack of pie plates is thus supported at four points about its periphery, as in the previously described embodiment of the invention, even though only six pairs of supporting blades are used for the two stacks. Seven guide rollers 33, however, are adequate for the two stacks of pie plates, since one roller 33' is mounted between the stacks in a position to engage both.

The solenoids 27' and 28' of the modified embodiment are connected to the switch 35 in the same manner as the solenoids 27 and 28, and in fact rapid replacement of loading mechanisms to accommodate pie plates of different sizes may be facilitated by the use of quick disconnect terminals on the switch so that removal of a loading mechanism may be effected by disconnecting the solenoid terminals at the switch and loosening the wing bolts 16, while replacement of another loading mechanism requires only reversal of these two steps.

From the foregoing description, taken together with the accompanying drawings, it will be readily apparent that this invention provides a labor saving automatic loading mechanism for a pie making machine whereby pie plates may be removed individually from a pile and deposited one by one on a conveyor, in position for filling at successive stations along the path of travel of the conveyor; and it will be further apparent that the loading mechanism of this invention is readily replaceable with another, adapted to handle pie plates of different size or in clusters of two or more, so as to provide the utmost flexibility and efficiency of operation.

What I claim as my invention is:

1. In a pie making machine: a movable conveyor adapted to carry pie plates along a defined path from a loading station, at which pie plates from a nested stack thereof are adapted to be loaded onto the conveyor, past subsequent stations at which the plates are filled; a supporting platform having an aperture therein through which a pie plate is adapted to pass flatwise; means readily detachably mounting said platform on a stationary part of the machine in a horizontal position above the conveyor and with said aperture in vertical alignment with said defined path of the conveyor; a plurality of pairs of lever-like support blades medially pivotally mounted on said platform for edgewise horizontal movement, each of said pairs of blades comprising an upper and a lower blade vertically spaced apart a distance substantially equal to the thickness of a pie plate rim to define upper and lower sets of blades with the blades of each set lying in a common plane; means constraining said blades to concurrent swinging motion from a position at which the blades of one set project radially inwardly of the edge of said aperture and the blades of the other set lie outside the edge of said aperture, to a position at which the situations of said blades with respect to said edge of the aperture are reversed; a plurality of link rods mounted for endwise back and forth movement between defined limits; a solenoid at each end of each of said link rods having a movable plunger connected with the link rod and adapted to move the latter to one of its defined limits; a connection between each pair of blades and one of the link rods whereby the blades are swung to one of their positions by movement of the link rod to one of its defined limits, and are swung to their other position by movement of the link rod to its other defined limit; switch means adapted to selectively connect a source of electric current with one or the other of said solenoids; and cooperating means on said conveyor and on said switch means for actuating said switch means to connect one of said solenoids with said source of current in consequence to movement of the conveyor through a predetermined distance of travel and to connect said other solenoid with the source of current at all other times.

2. The pie making machine of claim 1, further characterized by the provision of a plurality of vertical resilient guide posts mounted on said platform at equal distances from the center of said aperture and adapted to engage the peripheries of stacked pie plates on said platform to guide the same for flatwise downward movement, said guide posts being rotatable about their axes.

ELMER L. SHEEHAN.

REFERENCES CITED

The following references are of record in the file of this patent:

UNITED STATES PATENTS

| Number | Name | Date |
|---|---|---|
| 1,347,295 | Sedwick | July 20, 1920 |
| 1,367,081 | Olson | Feb. 1, 1921 |
| 2,345,937 | Joa | Apr. 4, 1944 |
| 2,355,478 | Stover | Aug. 8, 1944 |
| 2,466,228 | Glenn et al. | Apr. 5, 1949 |